United States Patent
Nakamura

(10) Patent No.: US 8,135,510 B2
(45) Date of Patent: Mar. 13, 2012

(54) ON-BOARD EMERGENCY REPORTING APPARATUS

(75) Inventor: Kazuo Nakamura, Obu (JP)

(73) Assignee: Denso Corporation, Kariya (JP)

( * ) Notice: Subject to any disclaimer, the term of this patent is extended or adjusted under 35 U.S.C. 154(b) by 1025 days.

(21) Appl. No.: 12/075,561

(22) Filed: Mar. 12, 2008

(65) Prior Publication Data

US 2008/0228349 A1 Sep. 18, 2008

(30) Foreign Application Priority Data

Mar. 16, 2007 (JP) ................................ 2007-068740

(51) Int. Cl.
*B60R 21/01* (2006.01)
(52) U.S. Cl. ......... 701/32.2; 701/45; 180/271; 180/274; 280/734; 280/739; 280/740
(58) Field of Classification Search ............... 701/29, 701/35, 36, 45; 180/271, 274, 282; 280/734, 280/735, 736, 739, 740
See application file for complete search history.

(56) References Cited

U.S. PATENT DOCUMENTS

| | | | | | |
|---|---|---|---|---|---|
| 5,978,017 | A | * | 11/1999 | Tino | 348/148 |
| 6,076,026 | A | * | 6/2000 | Jambhekar et al. | 701/35 |
| 6,141,611 | A | * | 10/2000 | Mackey et al. | 701/35 |
| 6,246,933 | B1 | * | 6/2001 | Bague | 701/35 |
| 6,298,290 | B1 | * | 10/2001 | Abe et al. | 701/35 |
| 6,324,450 | B1 | * | 11/2001 | Iwama | 701/35 |
| 6,574,538 | B2 | * | 6/2003 | Sasaki | 701/35 |
| 6,915,195 | B2 | * | 7/2005 | Miyoshi | 701/45 |
| 7,088,387 | B1 | * | 8/2006 | Freeman et al. | 348/155 |
| 7,180,407 | B1 | * | 2/2007 | Guo et al. | 340/436 |
| 7,413,218 | B2 | * | 8/2008 | Ekdahl | 280/739 |
| 7,536,457 | B2 | * | 5/2009 | Miller | 709/224 |
| 7,659,827 | B2 | * | 2/2010 | Gunderson et al. | 340/576 |
| 7,667,731 | B2 | * | 2/2010 | Kreiner et al. | 348/143 |
| 2002/0183905 | A1 | * | 12/2002 | Maeda et al. | 701/35 |
| 2002/0198640 | A1 | * | 12/2002 | Gehlot et al. | 701/35 |
| 2003/0080878 | A1 | * | 5/2003 | Kirmuss | 340/936 |

(Continued)

FOREIGN PATENT DOCUMENTS

JP 2001-043469 2/2001

(Continued)

OTHER PUBLICATIONS

Office Action dated Aug. 2, 2011 from the Japan Patent Office in the corresponding patent application No. 2007-068740 with English translation.

*Primary Examiner* — Thomas Black
*Assistant Examiner* — Peter D Nolan
(74) *Attorney, Agent, or Firm* — Harness, Dickey & Pierce, PLC

(57) ABSTRACT

An on-board emergency reporting apparatus includes a collision detection sensor, an airbag inflator for inflating an airbag in the event of collision detection, an airbag deflator for deflating the inflated airbag, a camera for capturing an image of an occupant seated on a seat provided with the airbag, a controller for transmitting the captured image to an emergency reporting center through a communication device, and a deflation sensor for detecting whether the volume of the inflated airbag is reduced to a predetermined threshold value. The controller causes the camera to start capturing upon detection of a reduction in the volume of the inflated airbag to the predetermined threshold value.

14 Claims, 6 Drawing Sheets

U.S. PATENT DOCUMENTS

| | | | |
|---|---|---|---|
| 2003/0081121 A1* | 5/2003 | Kirmuss | 348/143 |
| 2003/0081122 A1* | 5/2003 | Kirmuss | 348/148 |
| 2003/0081127 A1* | 5/2003 | Kirmuss | 348/207.99 |
| 2003/0081934 A1* | 5/2003 | Kirmuss | 386/46 |
| 2003/0081935 A1* | 5/2003 | Kirmuss | 386/46 |
| 2003/0090568 A1* | 5/2003 | Pico | 348/148 |
| 2005/0185052 A1* | 8/2005 | Raisinghani et al. | 348/148 |
| 2007/0001512 A1* | 1/2007 | Sato et al. | 307/9.1 |
| 2007/0100521 A1* | 5/2007 | Grae | 701/35 |
| 2007/0150140 A1* | 6/2007 | Seymour | 701/35 |
| 2009/0157255 A1* | 6/2009 | Plante | 701/35 |
| 2009/0222163 A1* | 9/2009 | Plante | 701/35 |

FOREIGN PATENT DOCUMENTS

| | | |
|---|---|---|
| JP | 2003-303384 | 10/2003 |
| JP | 2003-306106 | 10/2003 |

* cited by examiner

US 8,135,510 B2

ON-BOARD EMERGENCY REPORTING APPARATUS

CROSS REFERENCE TO RELATED APPLICATION

This application is based on and incorporates herein by reference Japanese Patent Application No. 2007-68740 filed on Mar. 16, 2007.

FIELD OF THE INVENTION

The present invention relates to an on-board emergency reporting apparatus including a camera device for capturing an image of an occupant seated on a seat with an airbag in the event of collision and a controller for transmitting the captured image to an emergency reporting center through a communication device.

BACKGROUND OF THE INVENTION

JP-A-2003-303384 discloses an on-board emergency reporting apparatus, in which a camera captures an image of an occupant when an airbag is inflated in the event of collision, and the captured image is transmitted to an emergency reporting center. Typically, an airbag is inflated in various manners. For example, when the impact of collision is large, multiple inflators for inflating the airbag are activated at a time. And, when the impact of collision is small, the inflators are activated with a time lag. Further, the inflation manner of the airbag depends on whether a seatbelt is worn and also depends on configuration of an airbag system. Therefore, it is difficult to estimate the time elapsed from inflation to deflation of the airbag. If the camera starts capturing the image of the occupant immediately after the collision occurs, the occupant in the image transmitted to the emergency reporting center may be restrained by the inflated airbag. In such a case, the appearance of the occupant cannot be clearly seen in the transmitted image. As a result, an operator at the emergency reporting center cannot determine whether the occupant in an emergency condition based on the transmitted image.

SUMMARY OF THE INVENTION

In view of the above-described problem, it is an object of the present invention to provide an on-board emergency reporting apparatus for transmitting an image, in which an occupant in an emergency condition is clearly captured, to an emergency reporting center.

According to an aspect of the present invention, an emergency reporting apparatus for a vehicle equipped with an airbag includes a collision detection device, an airbag inflator, an airbag deflator, a camera device, a controller, and a deflation sensor. The collision detection device is mounted to a predetermined portion of the vehicle to detect a collision of the vehicle. The airbag inflator inflates the airbag upon detection of the collision. The airbag deflator deflates the inflated airbag. The camera device captures an image of an occupant seated on a seat provided with the airbag. The controller transmits the image captured by the camera device to an emergency reporting center through a communication device. The deflation sensor detects whether the volume of the inflated airbag is reduced to a predetermined threshold value. The controller causes the camera device to start capturing upon detection of a reduction in the volume of the inflated airbag to the predetermined threshold value.

According to another aspect of the present invention, an emergency reporting apparatus for a vehicle equipped with a plurality of airbags includes a plurality of collision detection devices, an airbag inflator, a plurality of camera devices, and a controller. Each collision detection device is mounted to a different portion of the vehicle to detect a collision of the vehicle. The airbag inflator inflates the airbags upon detection of the collision by at least one of the collision detection devices. Each camera device captures an image of an occupant seated on a seat provided with a corresponding one of the airbags. Each camera device is associated with a corresponding one of the collision detection devices. The controller transmits the images captured by the camera devices to an emergency reporting center through a communication device. The controller identifies which of the collision detection devices detects the collusion and transmits the image captured by the camera device associated with the identified collision detection device to the emergency reporting center prior to other captured images.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS (First Embodiment)

Figure 1:
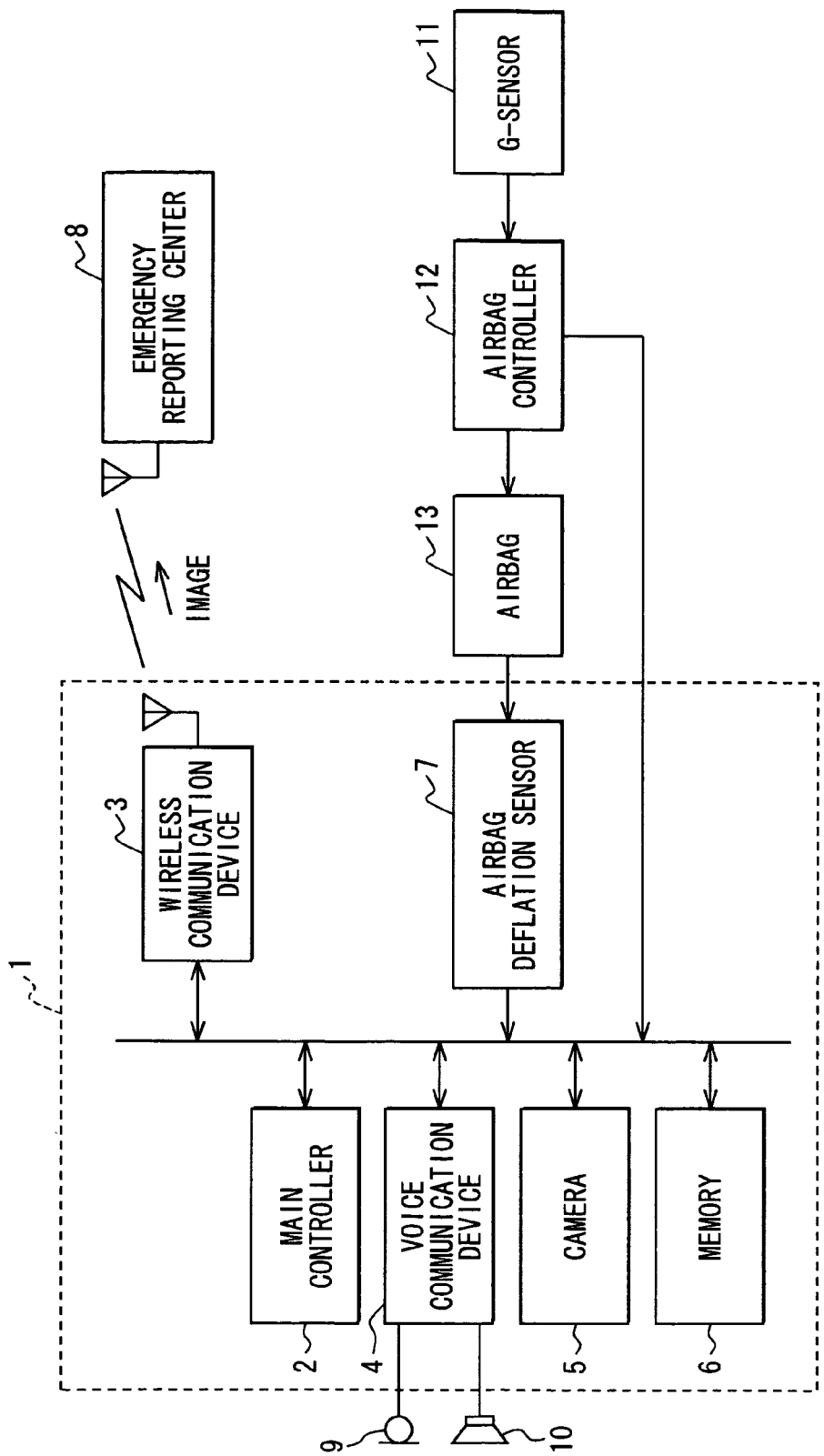
FIG. 1 is a functional block diagram illustrating an on-board emergency reporting apparatus according to a first embodiment of the present invention.

Referring to FIG. 1, an on-board emergency reporting apparatus 1 according to a first embodiment of the present invention includes a main controller 2, a wireless communication device 3, a voice communication device 4, a camera device 5, a memory device 6, and an airbag deflation sensor 7. The main controller 2 controls entire operations of the emergency reporting apparatus 1 and generally includes a microcomputer, a central processing unit (CPU), a random access memory (RAM), a read only memory (ROM), and an input/output (I/O) bus. Further, the main controller 2 has a function to measure (i.e., count) time.

The wireless communication device 3 performs a wireless communication with an external emergency reporting center 8 such as an emergency medical center, an emergency police station, and/or the like. The voice communication device 4 is coupled to a microphone 9 and a speaker 10. The microphone 9 picks up a driver's voice and transmits the picked up voice to the voice communication device 4. The voice communication device 4 receives the transmitted voice as a voice input and processes the voice input to generate an outgoing voice signal. The outgoing voice signal is transmitted to the emergency reporting center 8 through the wireless communication device 3. When receiving an incoming voice signal from the emergency reporting center 8 through the wireless communication device 3, the voice communication device 4 processes the incoming voice signal to generate a voice output. The voice output is outputted through the speaker 10. Thus, the wireless communication device 3 and the voice communication device 4 work in conjunction with each other to serve as a telephone device. The driver in the vehicle can have voice communication with an operator at the emergency reporting center 8 through the wireless communication device 3 and the voice communication device 4.

The camera device 5 is installed at a location where the camera device 5 can capture an image of a driver seated on a driver's seat provided with an airbag 13. The image captured by the camera device 5 is temporally stored in the memory device 6. A gravity (G) sensor 11 is mounted, for example, to a front edge of a vehicle frame. When detecting acceleration greater than a threshold value in the event of a frontal collision of the vehicle with an object such as a preceding vehicle, the G-sensor 11 transmits a collision detection signal to an airbag controller 12. The airbag 13 may be, for example, mounted to a steering wheel to be located in front of the driver's seat.

The airbag controller 12 activates an airbag inflator (not shown), for example, ten milliseconds after receipt of the collision detection signal from the G-sensor 11. When being activated, the airbag controller 12 charges gas to the airbag 13 to inflate the airbag 13. Then, the airbag controller 12 discharges the gas from the airbag 13 to deflate the airbag 13, for example, several tens of milliseconds after completion of inflation of the airbag 13. When the airbag 13 is inflated, a body of the driver seated on the driver's seat is restrained by the airbag 13. When the inflated airbag 13 is deflated, the body of the driver seated on the driver's seat is released from the restraint of the airbag 13. The airbag controller 12 outputs an airbag inflation detection signal to the main controller 2 at the same time when the airbag 13 is completely inflated.

The airbag deflation sensor 7 determines whether the volume of the inflated airbag 13 is reduced to a predetermined threshold value as a result of the deflation. The airbag deflation sensor 7 outputs an airbag deflation detection signal to the main controller 2 upon the reduction of the volume of the inflated airbag 13 to the predetermined threshold value. When the volume of the inflated airbag 13 is reduced to the predetermined threshold value, the driver seated on the driver's seat is suitably released from the restraint of the airbag 13 so that the camera device 5 can suitably capture the appearance of the driver. Therefore, if the camera device 5 starts capturing after the reduction of the volume of the inflated airbag 13 to the predetermined threshold value, the appearance of the driver is clearly seen in the captured image so that it can be determined whether the driver is in an emergency condition based on the captured image.

For example, to detect the reduction in the volume of the inflated airbag 13, the airbag deflation sensor 7 analyzes the image captured by the camera device 5 and calculates a ratio of (the number of dots in) the area colored with the color of the airbag 13 to (the number of dots in) the total area of the image. For another example, the airbag deflation sensor 7 is provided with a gas flow sensor and calculates a difference between the volume of the gas charged to the airbag 13 and the volume of the gas discharged from the airbag 13.

Further, the emergency reporting apparatus 1 has a function to detect a current location of the vehicle. For example, the emergency reporting apparatus 1 detects the current location of the vehicle by using a navigation system mounted on the vehicle. Upon receipt of the inflation detection signal from the airbag controller 12, the main controller 2 establishes a wireless connection to the emergency reporting center 8 through the wireless communication device 3. The wireless connection includes a voice connection and a data connection. The current location of the vehicle is transmitted to the emergency reporting center 8 through the data connection, and voice communication between the driver in the vehicle and the operator at the emergency reporting center 8 is achieved through the voice connection.

The emergency reporting apparatus 1 has first and second operation modes. In the first operation mode, simultaneous voice and data communications between the emergency reporting apparatus 1 and the emergency reporting center 8 is allowed. In the second operation mode, the simultaneous voice and data communications between the emergency reporting apparatus 1 and the emergency reporting center 8 is not allowed.

First, a first process performed in the first operation mode is described below with reference to FIG. 2. When the emergency reporting apparatus 1 is powered on, for example, by turning on an accessory switch of the vehicle, the first process starts at step S1. At step S1, the main controller 2 determines whether the airbag 13 has been completely inflated, i.e., determines whether to receive the inflation detection signal from the airbag controller 12. As described previously, the airbag controller 12 transmits the inflation detection signal to the main controller 2, when the airbag 13 is completely inflated. If the airbag 13 has been completely inflated corresponding to YES at step S1, the first process proceeds to both step S2 and step S8. Steps S2-S7 define a camera control procedure. Steps S8, S9 define a voice communication procedure. Thus, the main controller 2 performs the camera control procedure and the voice communication procedure in parallel.

In the voice communication procedure, the main controller 2 establishes the wireless connection to the emergency reporting center 8 through the wireless communication device 3 at step S8. Then, the first process proceeds to step S9, where the main controller 2 causes the voice communication device 4 to perform voice communication processing. In the voice communication processing, the microphone 9 can pick up the driver's voice and transmit the picked up voice to the voice communication device 4. The voice communication device 4 receives the transmitted voice as a voice input and processes the voice input to generate an outgoing voice signal. The outgoing voice signal is transmitted to the emergency reporting center 8 through the wireless communication device 3. When receiving an incoming voice signal from the emergency reporting center 8 through the wireless communication device 3, the voice communication device 4 processes the incoming voice signal to generate a voice output. The voice output is outputted through the speaker 10. Thus, the driver in the vehicle can have voice communication with the operator at the emergency reporting center 8.

In the camera control procedure, the main controller 2 starts counting time at step S2. Then, the first process proceeds to step S3, where the main controller 2 determines whether the volume of the inflated airbag 13 has been reduced to a predetermined threshold value, i.e., determines whether to receive the deflation detection signal from the airbag deflation sensor 7. As described previously, the airbag deflation sensor 7 transmits the deflation detection signal to the main controller 2, when the volume of the inflated airbag 13 is reduced to the predetermined threshold value.

If the volume of the inflated airbag 13 has been reduced to the predetermined threshold value corresponding to YES at step S3, the first process proceeds to step S5. In contrast, if the volume of the inflated airbag 13 has not been reduced to the predetermined threshold value corresponding to NO at step S3, the first process proceeds to step S4. At step S4, the main controller 2 determines whether a predetermined threshold period of time has elapsed since completion of inflation of the airbag 13. The threshold time period is set greater than an estimated time period in which the volume of the inflated airbag 13 will be reduced to the predetermined threshold value after the completion of inflation of the airbag 13.

If the threshold time period has elapsed since the completion of inflation of the airbag 13 corresponding to YES at step S4, the first process proceeds to step S5. In contrast, if the threshold time period has not elapsed since the completion of inflation of the airbag 13 corresponding to NO at step S4, the first process returns to step S3.

At step S5, the main controller 2 causes the camera device 5 to start capturing the image of the driver seated on the driver's seat and causes the memory device 6 to temporarily store the captured image. The driver captured in the image is released from the restraint of the airbag 13, because the image is captured after the volume of the inflated airbag 13 is reduced to the predetermined threshold value. Therefore, the appearance of the driver can be clearly seen in the image.

Then, the first process proceeds to step S6, where the main controller 2 determines whether the wireless connection to the emergency reporting center 8 has been established, i.e., determines whether the captured image can be transmitted to the emergency reporting center 8 through the wireless communication device 3. If the wireless connection to the emergency reporting center 8 has not been established corresponding to NO at step S6, the first process repeats step S6. In contrast, if the wireless connection to the emergency reporting center 8 has been established corresponding to YES at step S6, the first process proceeds to step S7. At step S7, the main controller 2 transmits the image stored in the memory device 6 to the emergency reporting center 8 through the wireless communication device 3. When the image is transmitted to the emergency reporting center 8, the camera control procedure is finished.

Thus, in the first operation mode where the simultaneous voice and data communications between the emergency reporting apparatus 1 and the emergency reporting center 8 is allowed, while the driver can have voice communication with the operator at the emergency reporting center 8, the image in which the driver is released from the restraint of the airbag 13 can be transmitted to the emergency reporting center 8.

Next, a second process performed in the second operation mode is described below with reference to FIG. 3. When the emergency reporting apparatus 1 is powered on, the second process starts at step S11. At step S11, the main controller 2 determines whether the airbag 13 has been completely inflated. If the airbag 13 has been completely inflated corresponding to YES at step S11, the second process proceeds to both step S12 and step S19. Steps S12-S18 define a camera control procedure. Steps S19, S20 define a voice communication procedure. Thus, the main controller 2 performs the camera control procedure and the voice communication procedure in parallel.

In the voice communication procedure, the main controller 2 establishes the wireless connection to the emergency reporting center 8 through the wireless communication device 3 at step S19. Then, the second process proceeds to step S20, where the main controller 2 causes the voice communication device 4 to perform voice communication processing. Thus, the driver in the vehicle can have voice communication with the operator at the emergency reporting center 8.

In the camera control procedure, the main controller 2 starts counting time at step S12. Then, the second process proceeds to step S13, where the main controller 2 determines whether the volume of the inflated airbag 13 has been reduced to a predetermined threshold value. If the volume of the inflated airbag 13 has been reduced to the predetermined threshold value corresponding to YES at step S13, the second process proceeds to step S15. In contrast, if the volume of the inflated airbag 13 has not been reduced to the predetermined threshold value corresponding to NO at step S13, the second process proceeds to step S14. At step S14, the main controller 2 determines whether a predetermined threshold period of time has elapsed since completion of inflation of the airbag 13. If the threshold time period has elapsed since the completion of inflation of the airbag 13 corresponding to YES at step S14, the second process proceeds to step S15. In contrast, if the threshold time period has not elapsed since the completion of inflation of the airbag 13 corresponding to NO at step S14, the second process returns to step S13.

At step S15, the main controller 2 causes the camera device 5 to start capturing an image of the driver seated on the driver's seat and causes the memory device 6 to temporarily store the captured image. Then, the second process proceeds to step S16, where the main controller 2 determines whether the wireless connection to the emergency reporting center 8 has been established. If the wireless connection to the emergency reporting center 8 has not been established corresponding to NO at step S16, the second process repeats step S16. In contrast, if the wireless connection to the emergency reporting center 8 has been established corresponding to YES at step S16, the second process proceeds to step S17.

At step S17, the main controller 2 determines whether the voice communication between the driver and the operator has been finished at the present time. If the voice communication has not been finished at the present time, the second process repeats step S17. In contrast, if the voice communication has been finished at the present time, the second process proceeds to step S18, where the main controller 2 transmits the captured image stored in the memory device 6 to the emergency reporting center 8 through the wireless communication device 3. When the image is transmitted to the emergency reporting center 8, the camera control procedure is finished.

Figure 2:
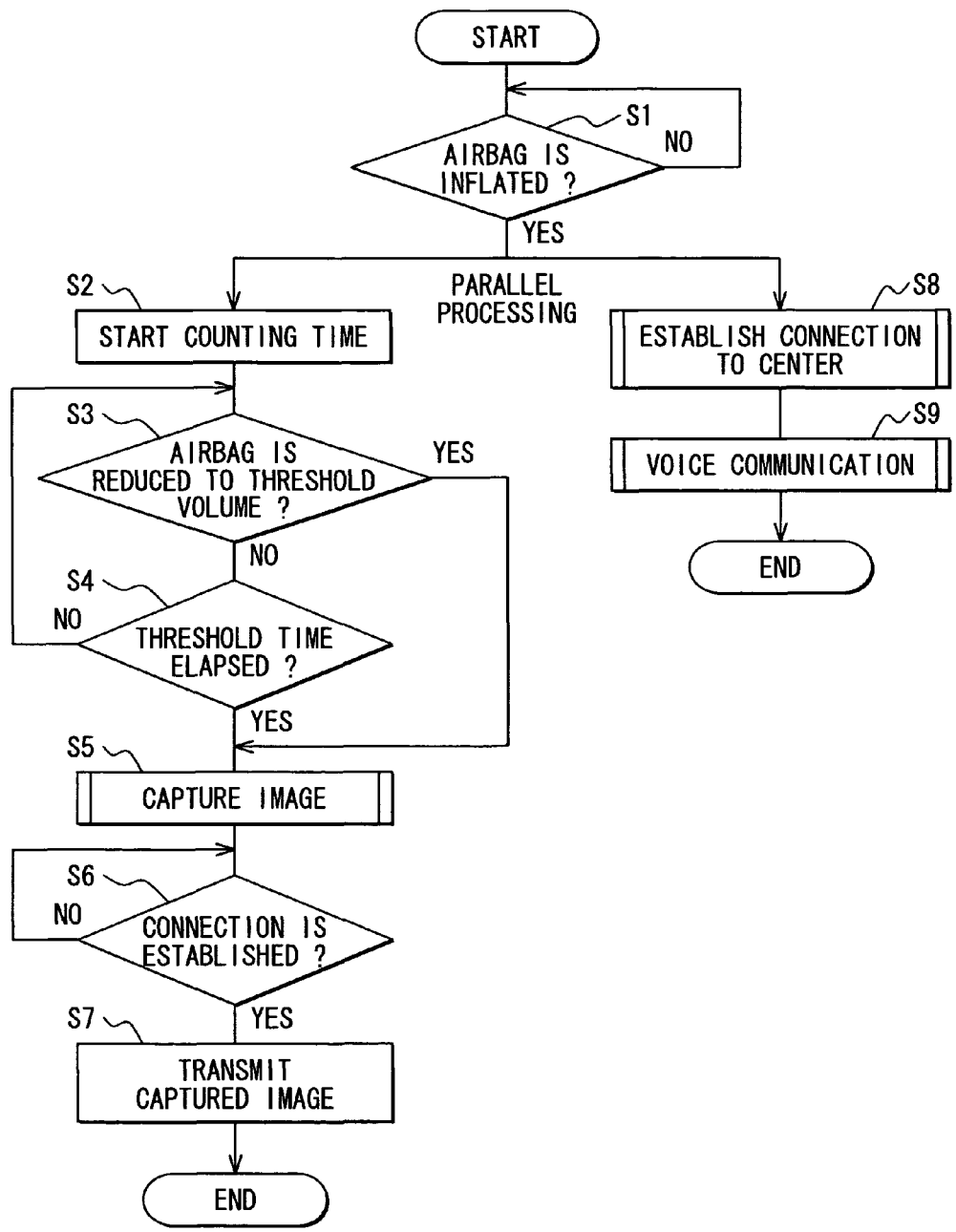
FIG. 2 is a flow diagram of a first operation mode of the emergency reporting apparatus of FIG. 1.
Figure 3:
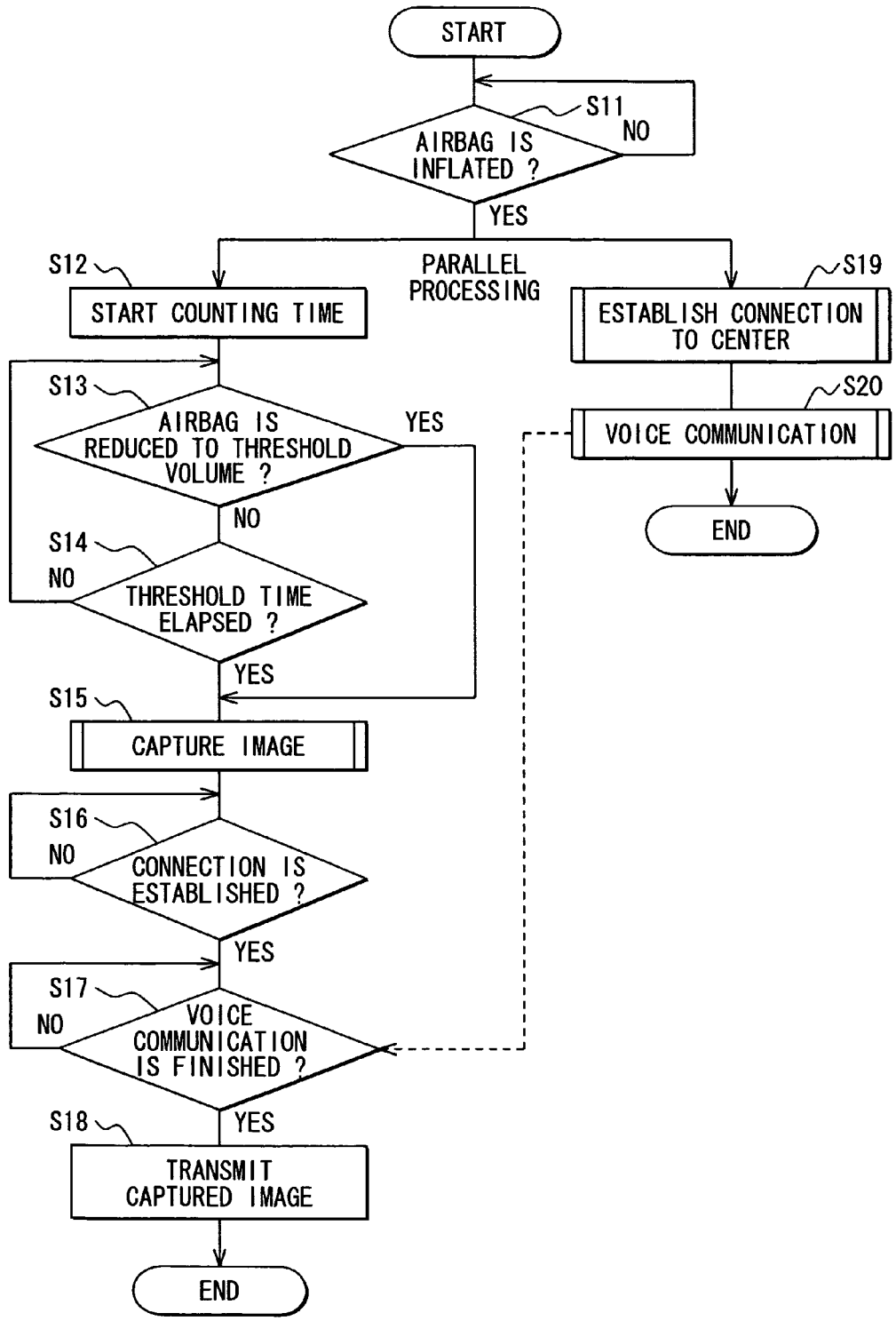
FIG. 3 is a flow diagram of a second operation mode of the emergency reporting apparatus of FIG. 1.

As can be seen by comparing FIGS. 2 and 3, a difference between the first and second operation modes is step S17. Specifically, in the second operation mode where the simultaneous voice and data communications between the emergency reporting apparatus 1 and the emergency reporting center 8 is not allowed, after the voice communication between the driver and the operator has been finished, the image in which the driver is released from the restraint of the airbag 13 is transmitted to the emergency reporting center 8.

The image captured by the camera device 5 can consist of a single flame or multiple frames. In other words, the image can be a still image or a moving image. Alternatively, still images can be successively transmitted to the emergency reporting center 8 and assembled into a moving image at the emergency reporting center 8. Alternatively, a moving image can be transmitted to the emergency reporting center 8 and disassembled into still images at the emergency reporting center 8.

As described above, according to the emergency reporting apparatus 1 of the first embodiment, the camera device 5 starts capturing after the volume of the inflated airbag 13 is reduced to the predetermined threshold value. In such an approach, the camera device 5 can suitably capture the appearance of the driver so that the driver captured in the image is released from the restraint of the airbag 13. The captured image in which the appearance of the driver is clearly seen is transmitted to the emergency reporting center 8. Based on the transmitted image, therefore, the operator at the emergency reporting center 8 can determine whether the driver is in an emergency condition.

Also, when the volume of the inflated airbag 13 is not reduced to the predetermined threshold value, the camera device 5 starts capturing in response to a lapse of a threshold time period since the completion of inflation of the airbag 13. In such an approach, even if the volume of the inflated airbag 13 is not reduced to the predetermined threshold value, for example, due to failures, the image in which the driver is almost clearly seen is transmitted to the emergency reporting center 8.

The airbag deflation sensor 7 detects the reduction in the volume of the inflated airbag 13 by analyzing the image captured by the camera device 5. In such an approach, the reduction in the volume of the inflated airbag 13 can be detected without an additional gas flow sensor for measuring the volume of gas charged to and discharged from the airbag 13. Alternatively, the airbag deflation sensor 7 can be provided with the gas flow sensor and detect the reduction in the volume of the inflated airbag 13 by calculating the difference between the volume of gas charged to the airbag 13 and the volume of gas discharged from the airbag 13 by using the gas flow sensor. In such an approach, the reduction in the volume of the inflated airbag 13 can be detected accurately.

(Second Embodiment)

Figure 4:
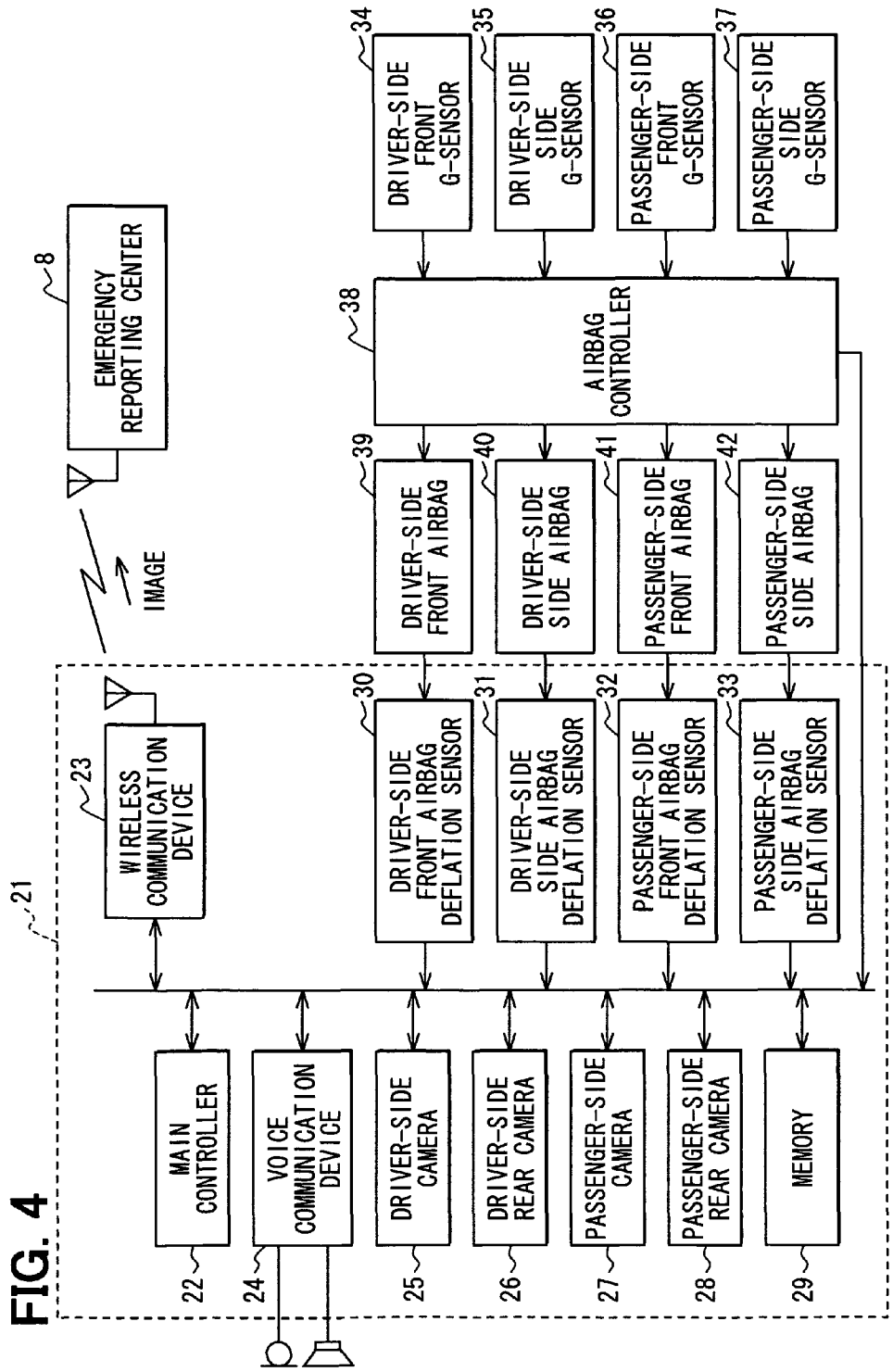
FIG. 4 is a functional block diagram illustrating an on-board emergency reporting apparatus according to a second embodiment of the present invention.

Referring to FIG. 4, an on-board emergency reporting apparatus 21 according to a second embodiment of the present invention includes a main controller 22, a wireless communication device 23, a voice communication device 24, a driver-side camera device 25, a driver-side rear camera device 26, a passenger-side camera device 27, a passenger-side rear camera device 28, a memory device 29, a driver-side front airbag deflation sensor 30, a driver-side side airbag deflation sensor 31, a passenger-side front airbag deflation sensor 32, and a passenger-side side airbag deflation sensor 33.

The driver-side camera device 25 is installed at a location where the driver-side camera device 25 can capture a driver seated on a driver's seat. The driver-side rear camera device 26 is installed at a location where the driver-side rear camera device 26 can capture a passenger seated on a driver-side rear seat. The passenger-side camera device 27 is installed at a location where the passenger-side camera device 27 can capture a passenger seated on a passenger's seat. The passenger-side rear camera device 28 is installed at a location where the passenger-side rear camera device 28 can capture a passenger seated on a passenger-side rear seat.

Each of a driver-side front G-sensor 34 and a passenger-side front G-sensor 36 is mounted, for example, to a front edge of a vehicle frame. A driver-side side G-sensor 35 is mounted on a side portion of the vehicle frame on the driver's side. A passenger-side side G-sensor 37 is mounted on a side portion of the vehicle frame on the passenger's side. When detecting acceleration greater than a threshold value in the event of collision of the vehicle with an object, each of the G-sensors 34-37 transmits a collision detection signal to an airbag controller 38.

When at least one of the driver-side front G-sensor 34 and the driver-side side G-sensor 35 detects the collision, the driver seated on the driver's seat is more likely to be damaged than the passenger seated on the passenger's seat. Therefore, when at least one of the driver-side front G-sensor 34 and the driver-side side G-sensor 35 detects the collision, an image captured by the driver-side camera device 25 needs to be transmitted to the emergency reporting center 8 prior to images captured by the camera devices 26-28. In contrast, when at least one of the passenger-side front G-sensor 36 and the passenger-side side G-sensor 37 detects the collision, the passenger seated on the passenger's seat is more likely to be damaged than the driver seated on the driver's seat. Therefore, when at least one of the passenger-side front G-sensor 36 and the passenger-side side G-sensor 37 detects the collision, an image captured by the passenger-side camera device 27 needs to be transmitted to the emergency reporting center 8 prior to images captured by the camera devices 25, 26, 28.

A driver-side front airbag 39 is mounted in front of the driver's seat. A driver-side side airbag 40 is mounted on a side of the driver's seat. A passenger-side front airbag 41 is mounted in front of the passenger's seat. A passenger-side side airbag 42 is mounted on a side of the passenger's seat. Upon receipt of the collision detection signal from at least one of the G-sensors 34-37, the airbag controller 38 changes gas to all of the airbags 39-42 at a time so that all of the airbags 39-42 start inflating at a time. Alternatively, the airbag controller 38 can change gas to the airbags 39-42 with a time lag according to acceleration detected by the G-sensors 34-37, so that the airbags 39-42 start inflating at respective timings. Then, the airbag controller 38 discharges gas from the airbags 39-42 to deflate the airbags 39-42, for example, several tens of milliseconds after completion of inflation of the e airbags 39-42, respectively.

The airbag controller 38 outputs an airbag inflation detection signal together with a G-sensor identification signal to the main controller 22 at the same time when each of the airbags 39-42 is completely inflated. The G-sensor identification signal identifies which of the G-sensors 34-37 detects the collision and outputs the collision detection signal. A driver-side front airbag deflation sensor 30 determines whether the volume of the inflated driver-side front airbag 39 is reduced to a predetermined threshold value. A driver-side side airbag deflation sensor 31 determines whether the volume of the inflated driver-side side airbag 40 is reduced to a predetermined threshold value. A passenger-side front airbag deflation sensor 32 determines whether the volume of the inflated passenger-side front airbag 41 is reduced to a predetermined threshold value. A passenger-side side airbag deflation sensor 33 determines whether the volume of the inflated passenger-side side airbag 42 is reduced to a predetermined threshold value.

The emergency reporting apparatus 21 has first and second operation modes. In the first operation mode, the simultaneous voice and data communications between the emergency reporting apparatus 21 and the emergency reporting center 8 is allowed. In the second operation mode, the simultaneous voice and data communications between the emergency reporting apparatus 21 and the emergency reporting center 8 is not allowed.

First, a first process performed in the first operation mode is described below with reference to FIG. 5. When the emergency reporting apparatus 21 is powered on, for example, by turning on an accessory switch of the vehicle, the first process starts at step S21. At step S21, the main controller 22 determines whether at least one of the airbags 39-42 is completely inflated, i.e., determines whether the main controller 22 receives the inflation detection signal together with the G-sensor identification signal from the airbag controller 38. If at least one of the airbags 39-42 is completely inflated corresponding to YES at step S21, the first process proceeds to both step S22 and step S32. Steps S22-S29 define a camera control procedure. Steps S32, S33 define a voice communication procedure. Thus, the main controller 22 performs the camera control procedure and the voice communication procedure in parallel.

In the voice communication procedure, the main controller 22 establishes the wireless connection to the emergency reporting center 8 through the wireless communication device 23 at step S32. Then, the first process proceeds to step S33, where the main controller 22 causes a voice communication device 24 to perform voice communication processing. Thus, the driver in the vehicle can have voice communication with the operator at the emergency reporting center 8.

In the camera control procedure, the main controller 22 starts counting time at step S22. Then, the first process proceeds to step S23, where the main controller 22 determines which of the G-sensors 34-37 detects the collision based on the G-sensor identification signal received from the airbag controller 38. Then, the first process proceeds to step S24, where the main controller 22 determines whether the volume of at least one of the inflated airbags 39-42 has been reduced to the predetermined threshold value.

If the volume of at least one of the inflated airbags 39-42 has been reduced to the predetermined threshold value corresponding to YES at step 24, the first process proceeds to step S30. At step S30, the main controller 22 causes the camera device corresponding to the airbag, the volume of which is reduced to the predetermined threshold value, to start capturing and causes the memory device 29 to temporarily store the captured image. Then, the first process proceeds to step S31, where the main controller 22 determines whether all of the camera devices 25-28 have started capturing. If all of the camera devices 25-28 have started capturing corresponding to YES at step S31, the first process proceeds to step S28. In contrast, if all of the camera devices 25-28 have not started capturing corresponding to NO at step S31, the first process returns to step S24.

If the volume of at least one of the inflated airbags 39-42 has not been reduced to the predetermined threshold value corresponding to NO at step S24, the first process proceeds to step S25. At step S25, the main controller 22 determines whether a predetermined threshold period of time has elapsed since the completion of inflation of at least one of the airbags 39-42. If the threshold time period has elapsed since the completion of inflation of at least one of the airbags 39-42, the first process proceeds to step S26. In contrast, if the threshold time period has not elapsed since the completion of inflation of at least one of the airbags 39-42, the first process returns to step S24.

At step S26, the main controller 22 causes the camera devices 25-28, which have not started capturing at the present time, to start capturing and causes the memory device 29 to temporarily store the captured image. Then, the first process proceeds to step S27, where the main controller 22 determines whether all of the camera devices 25-28 have started capturing. If all of the camera devices 25-28 have started capturing corresponding to YES at step S27, the first process proceeds to step S28. In contrast, if all of the camera devices 25-28 have not started capturing corresponding to NO at step S27, the first process returns to step S26.

At step S28, the main controller 22 determines whether the wireless connection to the emergency reporting center 8 has been established. If the wireless connection to the emergency reporting center 8 has not been established corresponding to NO at step S28, the first process repeats step S28. In contrast, if the wireless connection to the emergency reporting center 8 has been established corresponding to YES at step S28, the first process proceeds to step S29, where the main controller 22 transmits the captured images stored in the memory device 29 to the emergency reporting center 8 through the wireless communication device 23.

Specifically, the image captured by the camera corresponding to the G-sensor that has detected the collision is transmitted to the emergency reporting center 8 prior to other images stored in the memory device 29. For example, when the driver-side front G-sensor 34 has detected the collision, the image captured by the driver-side camera device 25 is transmitted to the emergency reporting center 8 prior to the images captured by the camera devices 26-28. For another example, when the passenger-side front G-sensor 36 has detected the collision, the image captured by the passenger-side camera device 27 is transmitted to the emergency reporting center 8 prior to the images captured by the camera devices 25, 26, 28

Then, the main controller 22 transmits the images remaining in the memory device 29 to the emergency reporting center 8 in a predetermined priority order. Alternatively, the main controller 22 transmits the images remaining in the memory device 29 to the emergency reporting center 8 in the order, in which the volumes of the airbags 39-42 are reduced to the predetermined threshold value. When all of the images stored in the memory device 29 are transmitted to the emergency reporting center 8, the camera control procedure is finished.

Next, a second process performed in the second operation mode is described below with reference to FIG. 6. When the emergency reporting apparatus 21 is powered on, the second process starts at step S41. At step S41, the main controller 22 determines whether at least one of the airbags 39-42 is completely inflated, i.e., determines whether the main controller 22 receives the inflation detection signal together with the G-sensor identification signal from the airbag controller 38. If at least one of the airbags 39-42 is completely inflated corresponding to YES at step S41, the second process proceeds to both step S42 and step S53. Steps S42-S50 define a camera control procedure. Steps S53, S54 define a voice communication procedure. Thus, the main controller 22 performs the camera control procedure and the voice communication procedure in parallel.

In the voice communication procedure, the main controller 22 establishes the wireless connection to the emergency reporting center 8 through the wireless communication device 23 at step S53. Then, the second process proceeds to step S54, where the main controller 22 causes the voice communication device 24 to perform voice communication processing. Thus, the driver in the vehicle can have voice communication with the operator at the emergency reporting center 8.

In the camera control procedure, the main controller 22 starts counting time at step S42. Then, the second process proceeds to step S43, where the main controller 22 determines which of the G-sensors 34-37 has detected the collision based on the G-sensor identification signal received from the airbag controller 38. Then, the second process proceeds to step S44, where the main controller 22 determines whether the volume of at least one of the inflated airbags 39-42 has been reduced to the predetermined threshold value.

If the volume of at least one of the inflated airbags 39-42 has been reduced to the predetermined threshold value corresponding to YES at step 44, the second process proceeds to step S51. At step S51, the main controller 22 causes the camera device corresponding to the airbag, the volume of which is reduced to the predetermined threshold value, to start capturing and causes the memory device 29 to store the captured image. Then, the second process proceeds to step S52, where the main controller 22 determines whether all of the camera devices 25-28 have started capturing. If all of the camera devices 25-28 have started capturing corresponding to YES at step S52, the second process proceeds to step S48.

In contrast, if all of the camera devices 25-28 have not started capturing corresponding to NO at step S48, the second process returns to step S44.

If the volume of at least one of the inflated airbags 39-42 has not been reduced to the predetermined threshold value corresponding to NO at step S44, the second process proceeds to step S45. At step S45, the main controller 22 determines whether a predetermined threshold period of time has elapsed since the completion of inflation of at least one of the airbag 39-42. If the threshold time period has elapsed since the completion of inflation of at least one of the airbag 39-42, the second process proceeds to step S46. In contrast, if the threshold time period has not elapsed since the completion of inflation of at least one of the airbag 39-42, the second process returns to step S44.

At step S46, the main controller 22 causes the camera devices 25-28, which have not started capturing at the present time, to start capturing and causes the memory device 29 to store the captured image. Then, the second process proceeds to step S47, where the main controller 22 determines whether all of the camera devices 25-28 have started capturing. If all of the camera devices 25-28 have started capturing corresponding to YES at step S47, the second process proceeds to step S48. In contrast, if all of the camera devices 25-28 have not started capturing corresponding to NO at step S47, the second process returns to step S46.

At step S48, the main controller 22 determines whether the wireless connection to the emergency reporting center 8 has been established. If the wireless connection to the emergency reporting center 8 has not been established corresponding to NO at step S48, the second process repeats step S48. In contrast, if the wireless connection to the emergency reporting center 8 has been established corresponding to YES at step S48, the second process proceeds to step S49.

At step S49, the main controller 22 determines whether the voice communication between the driver and the operator has been finished at the present time. If the voice communication has not been finished at the present time corresponding to NO at step S49, the second process repeats step S49. In contrast, if the voice communication has been finished at the present time corresponding to YES at step S49, the second process proceeds to step S50, where the main controller 22 transmits the captured images stored in the memory device 29 to the emergency reporting center 8 through the wireless communication device 23.

Specifically, the image captured by the camera device corresponding to the G-sensor that has detected the collision is transmitted to the emergency reporting center 8 prior to the images captured by other camera devices. Then, the main controller 22 transmits the images remaining in the memory device 29 to the emergency reporting center 8 in a predetermined priority order. Alternatively, the main controller 22 can transmit the images remaining in the memory device 29 to the emergency reporting center 8 in the order, in which the volumes of the airbags 39-42 are reduced to the predetermined threshold value. When all of the images stored in the memory device 29 are transmitted to the emergency reporting center 8, the camera control procedure is finished.

Figure 5:
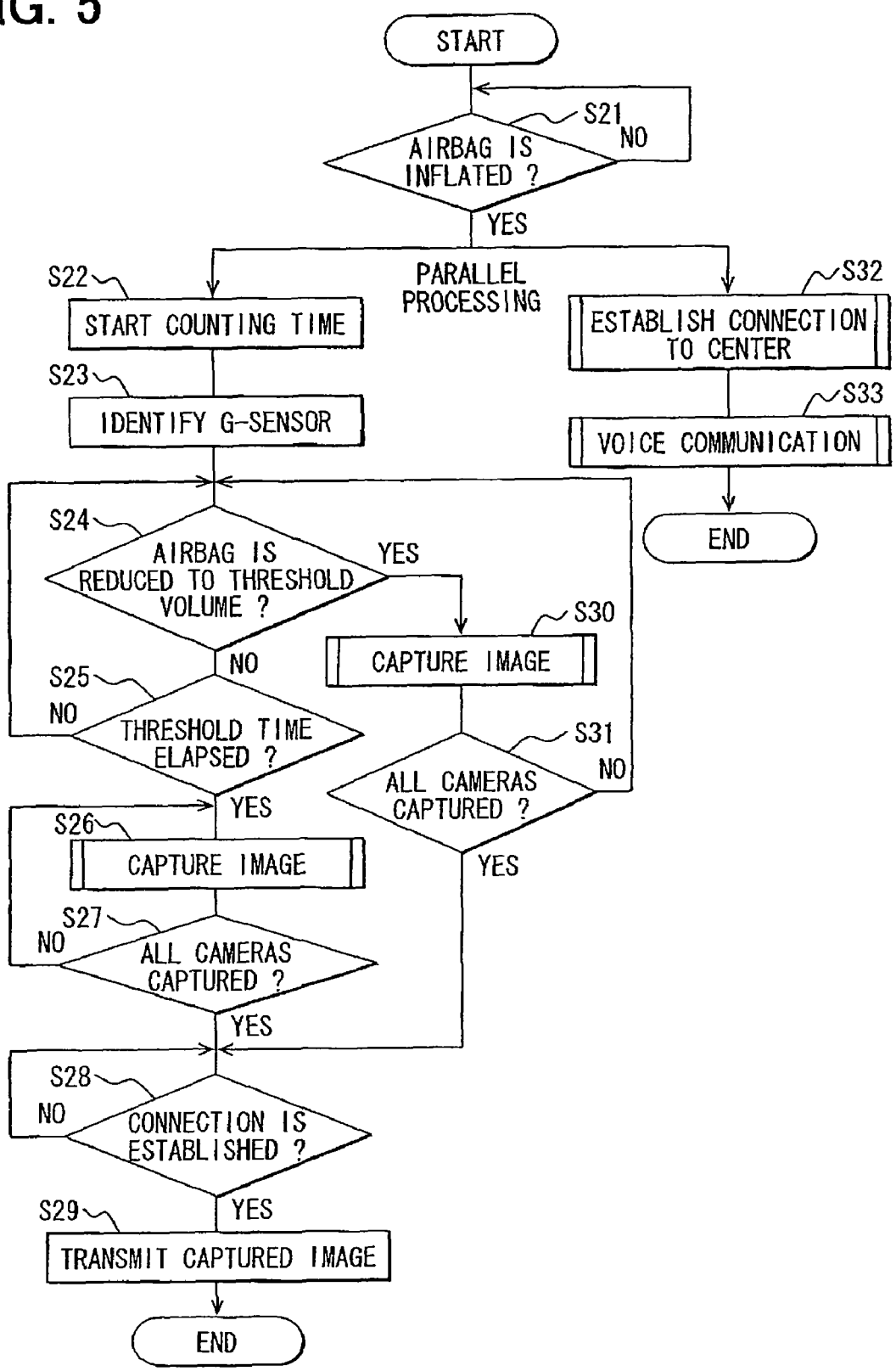
FIG. 5 is a flow diagram of a first operation mode of the emergency reporting apparatus of FIG. 4.
Figure 6:
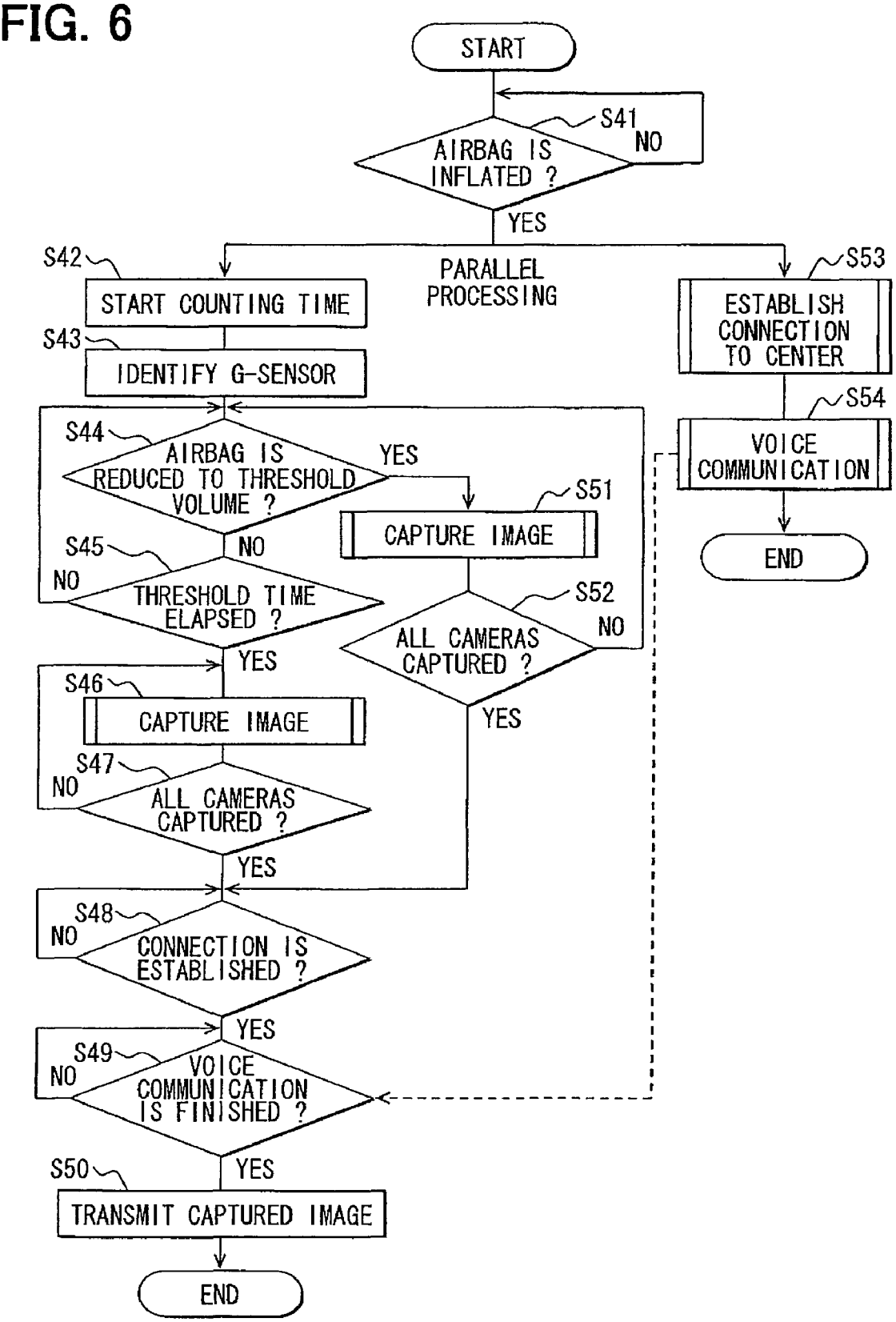
FIG. 6 is a flow diagram of a second operation mode of the emergency reporting apparatus of FIG. 4.

As can be seen by comparing FIGS. 5, 6, a difference between the first and second operation modes is step S49. Specifically, in the second operation mode where the simultaneous voice and data communications between the emergency reporting apparatus 21 and the emergency reporting center 8 is not allowed, after the voice communication between the driver in the vehicle and the operator at the emergency reporting center 8 has been finished, the images in which the driver and the passenger are released from the restraint of the airbags 39-42 are transmitted to the emergency reporting center 8.

As described above, according to the emergency reporting apparatus 21 of the second embodiment, the image captured by the camera device corresponding to the G-sensor that has detected the collision is transmitted to the emergency reporting center 8 prior to the images captured by other camera devices. In such an approach, an image in which an occupant more likely to be damaged by the collision is seen can be transmitted to the emergency reporting center 8 prior to other images.

Also, the camera devices 25-28 start capturing after the volumes of the inflated airbags 39-42 are reduced to the predetermined threshold value, respectively. In such an approach, the camera devices 25-28 can suitably capture the appearances of the occupants so that the occupants in the captured images can be released from the restraint of the respective airbags 39-42. The captured images in which the appearances of the occupants are clearly seen are transmitted to the emergency reporting center 8. Based on the transmitted images, therefore, the operator at the emergency reporting center 8 can determine whether the occupants are in an emergency condition.

(Modifications)

The embodiments described above may be modified in various ways. For example, various information such as a vehicle speed immediately before collision, a brake operation, a collision direction, and impact force of collision can be transmitted to the emergency reporting center 8 in addition to the image captured by the camera. The airbags 39-42 can be selectively inflated according to which of the G-sensors 34-37 detects collision.

Such changes and modifications are to be understood as being within the scope of the present invention as defined by the appended claims.

What is claimed is:

1. An emergency reporting apparatus for a vehicle equipped with an airbag, the emergency reporting apparatus comprising:
   a collision detection device mounted to a predetermined portion of the vehicle to detect a collision of the vehicle;
   an airbag inflator configured to inflate the airbag upon detection of the collision;
   an airbag deflator configured to deflate the inflated airbag;
   a camera device configured to capture an image of an occupant seated on a seat provided with the airbag;
   a controller configured to transmit the image captured by the camera device to an emergency reporting center through a communication device; and
   a deflation sensor configured to detect whether a volume of the inflated airbag is reduced to a predetermined threshold value,
   wherein the controller causes the camera device to start capturing upon detection of a reduction in the volume of the inflated airbag to the predetermined threshold value.

2. The emergency reporting apparatus according to claim 1,
   wherein the controller includes a timer device configured to count a time period elapsed since completion of inflation of the airbag, and
   wherein the controller causes the camera device to start capturing upon lapse of the time period prior to the detection of the reduction in the volume of the inflated airbag to the predetermined threshold value.

3. The emergency reporting apparatus according to claim 2, wherein when the air bag is not deflated due to failures, the controller causes the camera device to start capturing upon lapse of the time period prior to the detection of the reduction so that the occupant in the image captured by the camera device and transmitted to the emergency reporting center is restrained by the airbag.

4. The emergency reporting apparatus according to claim 1,
wherein the reduction in the volume of the inflated airbag to the predetermined threshold value releases the occupant from restraint of the airbag so that the occupant in the image captured by the camera device and transmitted to the emergency reporting center is released from restraint of the airbag.

5. An emergency reporting apparatus for a vehicle equipped with a plurality of airbags, the emergency reporting apparatus comprising:
a plurality of collision detection devices, each collision detection device being mounted to a different portion of the vehicle to detect a collision of the vehicle;
an airbag inflator configured to inflate the plurality of airbags upon detection of the collision by at least one of the plurality of collision detection devices;
a plurality of camera devices, each camera device being configured to capture an image of an occupant seated on a seat provided with a corresponding one of the plurality of airbags, each camera device being associated with a corresponding one of the plurality of collision detection devices;
a controller configured to transmit the plurality of images captured by the plurality of camera devices to an emergency reporting center through a communication device,
an airbag deflator configured to deflate the inflated plurality of airbags; and
a deflation sensor configured to detect whether a volume of the inflated plurality of airbags is reduced to a predetermined threshold value,
wherein the controller identifies which of the plurality of collision detection devices detects the collision and transmits the image captured by the camera device associated with the identified collision detection device to the emergency reporting center prior to other captured images; and
wherein the controller causes each camera device to start capturing upon detection of a reduction in the volume of the corresponding one of the inflated plurality of airbags to the predetermined threshold value.

6. The emergency reporting apparatus according to claim 5,
wherein the controller transmits the other captured images to the emergency reporting center in a predetermined priority order.

7. The emergency reporting apparatus according to claim 5,
wherein the occupant in the image captured by the camera device associated with the identified collision detection device and transmitted to the emergency reporting center is released from restraint of the airbag.

8. The emergency reporting apparatus according to claim 7,
wherein the controller includes a timer device configured to count a time period elapsed since completion of inflation of at least one of the plurality of airbag,
wherein the controller causes the plurality of camera devices, which have not started capturing at the present time, to start capturing upon lapse of the time period, and
wherein the at least one of the plurality of airbags is not deflated due to failures.

9. An emergency reporting apparatus for a vehicle equipped with an airbag, the emergency reporting apparatus comprising:
a collision detection device mounted to a predetermined portion of the vehicle to detect a collision of the vehicle;
an airbag inflator configured to inflate the airbag upon detection of the collision;
an airbag deflator configured to deflate the inflated airbag;
a camera device configured to capture an image of an occupant seated on a seat provided with the airbag;
a controller configured to transmit the image captured by the camera device to an emergency reporting center through a communication device; and
a deflation sensor configured to detect whether a volume of the inflated airbag is reduced to a predetermined threshold value,
wherein the controller causes the camera device to start capturing upon detection of a reduction in the volume of the inflated airbag to the predetermined threshold value, and
wherein the deflation sensor detects the reduction in the volume of the inflated airbag to the predetermined threshold value by analyzing the image captured by the camera device.

10. The emergency reporting apparatus according to claim 9,
wherein the controller includes a timer device configured to count a time period elapsed since completion of inflation of the airbag, and
wherein the controller causes the camera device to start capturing upon lapse of the time period prior to the detection of the reduction in the volume of the inflated airbag to the predetermined threshold value.

11. An emergency reporting apparatus for a vehicle equipped with an airbag, the emergency reporting apparatus comprising:
a collision detection device mounted to a predetermined portion of the vehicle to detect a collision of the vehicle;
an airbag inflator configured to inflate the airbag upon detection of the collision;
an airbag deflator configured to deflate the inflated airbag;
a camera device configured to capture an image of an occupant seated on a seat provided with the airbag;
a controller configured to transmit the image captured by the camera device to an emergency reporting center through a communication device; and
a deflation sensor configured to detect whether a volume of the inflated airbag is reduced to a predetermined threshold value,
wherein the controller causes the camera device to start capturing upon detection of a reduction in the volume of the inflated airbag to the predetermined threshold value, and
wherein the deflation sensor detects the reduction in the volume of the inflated airbag to the predetermined threshold value by calculating a difference between a volume of gas charged to the airbag and a volume of gas discharged from the airbag.

12. The emergency reporting apparatus according to claim 11,
wherein the controller includes a timer device configured to count a time period elapsed since completion of inflation of the airbag, and
wherein the controller causes the camera device to start capturing upon lapse of the time period prior to the detection of the reduction in the volume of the inflated airbag to the predetermined threshold value.

13. An emergency reporting apparatus for a vehicle equipped with a plurality of airbags, the emergency reporting apparatus comprising:
- a plurality of collision detection devices, each collision detection device being mounted to a different portion of the vehicle to detect a collision of the vehicle;
- an airbag inflator configured to inflate the plurality of airbags upon detection of the collision by at least one of the plurality of collision detection devices;
- a plurality of camera devices, each camera device being configured to capture an image of an occupant seated on a seat provided with a corresponding one of the plurality of airbags, each camera device being associated with a corresponding one of the plurality of collision detection devices;
- a controller configured to transmit the plurality of images captured by the plurality of camera devices to an emergency reporting center through a communication device,
- an airbag deflator configured to deflate the inflated plurality of airbags; and
- a deflation sensor configured to detect whether a volume of the inflated plurality of airbags is reduced to a predetermined threshold value,
- wherein the controller identifies which of the plurality of collision detection devices detects the collision and transmits the image captured by the camera device associated with the identified collision detection device to the emergency reporting center prior to other captured images,
- wherein the controller causes each camera device to start capturing upon detection of a reduction in the volume of the corresponding one of the inflated plurality of airbags to the predetermined threshold value, and
- wherein the controller transmits the other captured images to the emergency reporting center in an order in which the deflation sensor detects the reduction of the inflated plurality of airbags to the predetermined threshold value.

14. The emergency reporting apparatus according to claim 13,
wherein the controller transmits the other captured images to the emergency reporting center in a predetermined priority order.

* * * * *